(12) United States Patent
Klipper et al.

(10) Patent No.: US 8,177,982 B2
(45) Date of Patent: May 15, 2012

(54) METHOD OF PRODUCING MONODISPERSE CHELATE RESINS

(75) Inventors: Reinhold Klipper, Köln (DE); Michael Schelhaas, Köln (DE); Stefan Neumann, Leverkusen (DE); Wolfgang Zarges, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 780 days.

(21) Appl. No.: 12/218,435

(22) Filed: Jul. 15, 2008

(65) Prior Publication Data

US 2009/0045137 A1 Feb. 19, 2009

(30) Foreign Application Priority Data

Jul. 23, 2007 (DE) .......................... 10 2007 034 733

(51) Int. Cl.
*B01D 53/14* (2006.01)
(52) U.S. Cl. ............. 210/684; 95/133; 521/32; 528/422
(58) Field of Classification Search .................. 210/684; 528/422; 521/32; 95/133
See application file for complete search history.

(56) References Cited

U.S. PATENT DOCUMENTS

| | | | |
|---|---|---|---|
| 4,031,038 A | 6/1977 | Grinstead et al. | 260/2.28 |
| 4,098,867 A * | 7/1978 | Grinstead et al. | 423/24 |
| 4,382,124 A | 5/1983 | Meitzner et al. | 521/38 |
| 4,419,245 A | 12/1983 | Barrett et al. | 210/681 |
| 4,427,794 A | 1/1984 | Lange et al. | 521/28 |
| 4,444,961 A | 4/1984 | Timm | 526/88 |
| 5,141,965 A * | 8/1992 | Pike | 521/32 |
| 6,329,435 B1 * | 12/2001 | Klipper et al. | 521/33 |
| 6,699,913 B1 | 3/2004 | Klipper et al. | |
| 7,708,892 B2 * | 5/2010 | Klipper et al. | 210/683 |
| 2002/0193454 A1 | 12/2002 | Lutjens et al. | 521/32 |

FOREIGN PATENT DOCUMENTS

| | | |
|---|---|---|
| DE | 1 045 102 | 3/1957 |
| DE | 1 113 570 | 3/1957 |
| EP | 0 481 603 | 4/1992 |
| EP | 481603 A1 * | 4/1992 |
| WO | 93/12167 | 6/1993 |
| WO | 2007/088010 | 8/2007 |
| WO | WO-2007-088010 A1 * | 8/2007 |
| WO | 2007/101584 | 9/2007 |

OTHER PUBLICATIONS

R. Hering, Chelatbildende Ionentauscher (Chelated-forming Ion Exchanges), Akademie Verlag, Berlin, 1967, pp. 150-157.
Xuenin Chen, et al.; Journal of East China Normal University, Natural Science Ed. No. 2, May 1, 1985.

* cited by examiner

Primary Examiner — Peter D. Mulcahy
Assistant Examiner — Henry Hu
(74) Attorney, Agent, or Firm — Nicanor A. Kohncke

(57) ABSTRACT

The present invention relates to a method of producing novel monodisperse chelate resins based on crosslinked polymer beads containing aminomethyl groups and/or aminomethyl nitrogen heterocyclic groups that have a high uptake capacity for heavy metals and rapid kinetics.

6 Claims, No Drawings

METHOD OF PRODUCING MONODISPERSE CHELATE RESINS

CROSS REFERENCE TO RELATED PATENT APPLICATIONS

The present patent application claims the right of priority of German Patent Application DE 10 2007 034 733.4 filed on 23 Jul. 2007.

The present invention relates to a method of producing novel monodisperse chelate resins based on crosslinked polymer beads containing aminomethyl groups and/or aminomethyl nitrogen heterocyclic groups that have a high uptake capacity for heavy metals and rapid kinetics.

BACKGROUND OF THE INVENTION

For a relatively long time, use has been made of ion exchangers for removing valuable metals and heavy metals such as tin, cobalt, nickel, copper, zinc, lead, uranium, bismuth, vanadium, elements of the platinum group such as ruthenium, osmium, iridium, rhodium, palladium, platinum, and also the noble metals gold and silver, in particular from aqueous solutions. For this purpose, in addition to cation exchangers or anion exchangers, use is also preferably made of chelate resins.

The use of chelate resins for removing heavy metals or valuable metals is described, for example, in R. Hering, Chelatbildende Ionentauscher [Chelate-forming Ion Exchangers], Akademie Verlag, Berlin, 1967, pages 150 to 157. Mention is made, inter alia, of chelate resins containing iminoacetic acid groups. Chelate resins in many cases exhibit a significantly higher selectivity for heavy metals than, for example, cation exchangers containing strongly acidic sulphonic acid groups.

The customary ion exchangers take up heavy metals from aqueous solutions at pH>4. At pHs less than approximately 4, the selectivity of chelate resins for heavy metals decreases, since their functional groups are protonated. However, the removal of heavy metals from solutions or suspensions having strongly acid pHs in the range from about 4 to about 1 is of considerable technical interest.

For the recovery of heavy metals, rocks are treated with sulphuric acid. The valuable metals are dissolved out of the rock and are present in the strongly acidic rock-sulphuric acid suspension. In addition to the valuable metals, the rocks frequently also contain iron which is frequently present in dissolved form as iron 3+ ion. Ion exchangers take up iron 3+ ions readily without, however, subsequently releasing them to the same extent on regeneration of the ion exchanger. Iron ions therefore block the exchange capacity of the ion exchanger.

Ion exchangers are sought which can take up valuable metals from acidic solutions or suspensions in the pH range from 4 to about 1 considerably more selectively than iron ions.

U.S. Pat. No. 4,098,867 and U.S. Pat. No. 4,031,038 describe chelate resins which bear methylaminopyridine groups.

They are produced by halomethylating polymer beads based on styrene and divinylbenzene, wherein, on average, 0.1 to 1.0 halomethyl groups are introduced per aromatic ring as a reactive group for adding the aminomethylpyridine chelate functionality.

Restricting the degree of halomethylation of the polymer beads also restricts the amount of aminomethylpyridine groups in the chelate resin and therefore the exchange capacity of the chelate resin.

The halomethylation method described in U.S. Pat. No. 4,098,867 for introducing the functional group has disadvantages which lead to a restriction of the degree of functionalization. The disadvantages are described in EP-A 0 481 603. For instance, on halomethylation, post-crosslinking occurs which leads to a loss of halomethyl groups. Owing to the resultant loss of halomethyl groups which could be reacted with aminomethylpyridines, the resultant chelate resins have fewer functional groups available for recovering valuable metals, which considerably limits their use in metallurgy. It was an object of the present invention to provide a highly functionalized high-capacity chelate resin which is stable even at low pHs which effectively adsorbs valuable metals from acidic aqueous solutions even in the presence of iron ions.

SUMMARY OF THE INVENTION

The solution of the object and therefore subject matter of the present invention are monodisperse chelate resins containing aminomethyl groups and/or aminomethyl nitrogen heterocyclic groups as functional groups characterized in that these are produced by the phthalimide method, avoiding a haloalkylated intermediate.

Surprisingly, it has been found that chelate exchangers produced by the phthalimide method do not exhibit post-crosslinking, as a result of which a higher degree of substitution of the aromatic rings with functional groups is achieved, and resulting therefrom, a higher exchange capacity in the end product is achieved. Furthermore, the yield of end product, based on the monomers used is markedly higher than in the case of end products which are produced according to the prior art. Finally, the chelate resins of the invention, compared with the prior art, exhibit more favourable kinetic behaviour and better separation efficiencies.

In a preferred embodiment, the present invention relates to a method of producing monodisperse chelate exchangers containing aminomethyl groups and/or aminomethyl nitrogen heterocyclic groups, characterized in that a) monomer droplets of at least one monovinylaromatic compound, at least one polyvinylaromatic compound and one initiator or an initiator combination and also optionally a porogen are reacted to give monodisperse crosslinked polymer beads, b) these monodisperse crosslinked polymer beads are amidomethylated with phthalimide derivatives, c) the amidomethylated polymer beads are converted to aminomethylated polymer beads and d) the aminomethylated polymer beads are reacted with halomethyl nitrogen heterocycles to form chelate exchangers containing aminomethyl groups and/or aminomethyl nitrogen heterocyclic groups as anion-exchanging groups without post-crosslinking, maintaining a pH in the range 4 to 9.

The present invention, however, also relates to monodisperse chelate exchangers obtainable by a) reacting monomer droplets of at least one monovinylaromatic compound, at least one polyvinylaromatic compound and one initiator or an initiator combination and also optionally a porogen to give monodisperse crosslinked polymer beads, b) amidomethylating these monodisperse crosslinked polymer beads with phthalimide derivatives, c) converting the amidomethylated polymer beads to aminomethylated polymer beads and d) reacting the aminomethylated polymer beads with halomethyl nitrogen heterocycles, maintaining a pH in the range 4 to 9, to form chelate exchangers containing aminomethyl groups and/or aminomethyl nitrogen heterocyclic groups as anion-exchanging groups without post-crosslinking.

According to the invention, the chelate exchangers obtainable after stage d) have functional groups of the structures —$CH_2$—$NH_2$ and/or —$CH_2$—$N(R)_x$, wherein R is hydrogen or a methyl nitrogen heterocyclic radical and X is 1, 2 or 3. Preferably, the chelate exchangers of the invention have a macroporous structure.

The monodisperse crosslinked vinylaromatic basic polymer according to method step a) can be produced by the methods known from the literature. For example, such methods are described in U.S. Pat. No. 4,444,961, EP-A 0 046 535, U.S. Pat. No. 4,419,245 or WO 93/12167, the contents of which are incorporated by the present application with respect to method step a).

In method step a), use is made of at least one monovinylaromatic compound and at least one polyvinylaromatic compound. However, it is also possible to make use of mixtures of two or more monovinylaromatic compounds and mixtures of two or more polyvinylaromatic compounds.

As monovinylaromatic compounds in the meaning of the present invention, in method step a), use is preferably made of monoethylenically unsaturated compounds, particularly preferably styrene, vinyltoluene, ethylstyrene, α-methylstyrene, chlorostyrene, chloromethylstyrene, acrylic acid alkylesters or methacrylic acid alkylesters.

Especially preferably, use is made of styrene or mixtures of styrene with the abovementioned monomers.

Preferred polyvinylaromatic compounds in the meaning of the present invention are, for method step a), multifunctional ethylenically unsaturated compounds, particularly preferably divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate or allyl methacrylate.

The polyvinylaromatic compounds are preferably used in amounts of 1-20% by weight, particularly preferably 2-12% by weight, especially preferably 4-10% by weight, based on the monomer or its mixture with further monomers. The type of the polyvinylaromatic compounds (crosslinkers) is chosen with respect to the later use of the polymer beads. Divinylbenzene is especially preferred in many cases. For most applications, commercial divinylbenzene qualities which, in addition to the isomers of divinylbenzene, also contain ethylvinylbenzene, are adequate.

In a preferred embodiment of the present invention, in method step a) use is made of microencapsulated monomer droplets, wherein for the microencapsulation of the monomer droplets, materials known for use as complex coacervates come into consideration, in particular polyesters, natural and synthetic polyamides, polyurethanes, polyureas.

As natural polyamide, use is preferably made of gelatine. This is used in particular as coacervate and complex coacervate. Gelatine-containing complex coacervates, in the meaning of the invention, are taken to mean especially combinations of gelatines with synthetic polyelectrolytes. Suitable synthetic polyelectrolytes are copolymers having built-in units of, for example, maleic acid, acrylic acid, methacrylic acid, acrylamide and methacrylamide. Particularly preferably use is made of acrylic acid and acrylamide. Gelatine-containing capsules can be cured using customary curing agents such as, for example, formaldehyde or glutardialdehyde. The encapsulation of monomer droplets with gelatine, gelatine-containing coacervates and gelatine-containing complex coacervates is described in detail in EP-A 0 046 535. The methods of encapsulation with synthetic polymers are known. For example, phase boundary condensation is very suitable, in which a reactive component (for example, an isocyanate or an acid chloride) dissolved in monomer droplets is reacted with a second reactive component (for example, an amine) which is dissolved in the aqueous phase.

The optionally microencapsulated monomer droplets contain an initiator or mixtures of initiators to start the polymerization. Suitable initiators for the method of the invention are preferably peroxy compounds, particularly preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds, particularly preferably 2,2'-azo-bis(isobutyronitrile) or 2,2'-azobis(2-methylisobutyronitrile).

The initiators are preferably used in amounts of 0.05 to 2.5% by weight, particularly preferably 0.1 to 1.5% by weight, based on the monomer mixture.

As further additives to the optionally microencapsulated monomer droplets, porogens can optionally be used in order to generate a macroporous structure in the spherical polymer. Organic solvents are suitable therefor which dissolve or swell the resultant polymer poorly. Preferably mention may be made of hexane, octane, isooctane, isododecane, methyl ethyl ketone, butanol or octanol and its isomers.

The expressions microporous or gel-type or macroporous have already been described extensively in the specialist literature. Preferred polymer beads in the meaning of the present invention, produced by method step a), have a macroporous structure.

Monodisperse in the present application designates those polymer beads or chelate resins in which at least 90% by volume or mass of the particles have a diameter which is in the interval having the width of ±10% of the most frequent diameter around the most frequent diameter.

For example, in the case of polymer beads having the most frequent diameter 0.5 mm, at least 90% by volume or mass are in a size interval between 0.45 mm and 0.55 mm, in the case of a substance having the most frequent diameter 0.7 mm, at least 90% by volume or mass are in a size interval between 0.77 mm and 0.63 mm.

According to the invention, the monodispersity of polymer beads in step a) is obtained by use of jetting (nozzle-injection method) or by seed-feed methods. For example, such methods and monodisperse ionic exchangers to be produced therefrom are described in U.S. Pat. No. 4,444,961, EP-A 0 046 535, U.S. Pat. No. 4,419,245 or WO 93/12167.

The formation of monodisperse, macroporous polymer beads can proceed, for example, by addition of inert materials (porogens) to the monomer mixture during polymerization. Suitable materials as such are especially organic substances which dissolve in the monomer, but dissolve or swell the polymer poorly (precipitants for polymers) for example aliphatic hydrocarbons (Farbenfabriken Bayer DBP 1045102, 1957; DBP 1113570, 1957).

In U.S. Pat. No. 4,382,124 as porogen, use is made of, for example, alcohols having 4 to 10 carbon atoms for producing monodisperse, macroporous polymer beads based on styrene/divinylbenzene. In addition, an overview is given of production methods of macroporous polymer beads.

The optionally microencapsulated monomer droplets can optionally also contain up to 30% by weight (based on the monomer) of crosslinked or noncrosslinked polymer. Preferred polymers are derived from the abovementioned monomers, preferably from styrene.

The mean particle size of the optionally encapsulated monomer droplets is 10-1000 μm, preferably 100-1000 μm. In the production of the monodisperse polymer beads according to method step a), the aqueous phase can optionally contain a dissolved polymerization inhibitor. Inhibitors within the meaning of the present invention which come into consideration are both inorganic and organic substances. Examples of inorganic inhibitors are nitrogen compounds such as hydroxylamine, hydrazine, sodium nitrite and potassium nitrite, salts of phosphorus acid such as sodium hydrogen phosphite and also sulphur compounds such as sodium dithionite, sodium thiosulphate, sodium sulphite, sodium bisulphite, sodium rhodanide and ammonium rhodanide. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further suitable organic inhibitors are nitrogen compounds. These include hydroxylamine derivatives such as, for example, N,N-diethylhydroxylamine, N-isopropylhydroxylamine and also sulphonated or carboxylated N-alkylhydroxylamine or N,N-dialkylhydroxylamine derivatives, hydrazine derivatives such as, for example, N,N-hydrazinodiacetic acid, nitroso compounds such as, for example, N-nitrosophenylhydroxylamine, N-nitrosophenylhydroxylamine ammonium salt or N-nitrosophenylhydroxylamine aluminium salt. The concentration of the inhibitor is 5-1000 ppm (based on the aqueous phase), preferably 10-500 ppm, particularly preferably 10-250 ppm.

Polymerization of the optionally microencapsulated monomer droplets to give the spherical monodisperse polymer beads proceeds, as mentioned above, preferably in the presence of one or more protective colloids in the aqueous phase. Suitable protective colloids are natural or synthetic water-soluble polymers, such as, for example, gelatine, starch, poly(vinyl alcohol), polyvinylpyrrolidone, polyacrylic acid, polymethacrylic acid or copolymers of (meth) acrylic acid and (meth)acrylic esters. Very highly suitable compounds are also cellulose derivatives, in particular cellulose esters and cellulose ethers, such as carboxymethylcellulose, methylhydroxyethylcellulose, methylhydroxypropylcellulose and hydroxyethylcellulose. A particularly highly suitable compound is gelatine. The usage rate of the protective colloids is generally 0.05 to 1% by weight, based on the aqueous phase, preferably 0.05 to 0.5% by weight.

The polymerization to give the spherical, monodisperse, macroporous polymer beads in method step a) can optionally also be carried out in the presence of a buffer system. Preference is given to buffer systems which set the pH of the aqueous phase at the start of polymerization to a value between 14 and 6, preferably between 12 and 8. Under these conditions protective colloids are present with carboxyl groups whole or partly as salts. In this manner, the action of the protective colloids is favourably influenced. Particularly highly suitable buffer systems contain phosphate salts or borate salts. The expressions phosphate and borate within the meaning of the invention also comprise the condensation products of acids and salts corresponding to the ortho forms. The concentration of the phosphate or borate in the aqueous phase is 0.5-500 mmol/l, preferably 2.5-100 mmol/l.

The agitator speed during polymerization is thus critical and, in contrast to customary bead polymerization, does not have an effect on particle size. Low agitator speeds are employed which are sufficient to keep the suspended monomer droplets in suspension and to support the removal of the heat of polymerization. For this task, use can be made of various agitator types, particularly suitable agitators are axially-acting gate agitators.

The volume ratio of encapsulated monomer droplets to aqueous phase is preferably 1:0.75 to 1:20, particularly preferably 1:1 to 1:6.

The polymerization temperature depends on the decomposition temperature of the initiator used. It is generally between 50 and 180° C., preferably between 55 and 130° C. The polymerization lasts for 0.5 hour to a few hours. It has proven useful to employ a temperature programme in which the polymerization is started at low temperature, for example, 60° C., and the reaction temperature is increased with advancing polymerization conversion rate. In this manner, for example, the demands for a reliable reaction course and high polymerization conversion rate can be met very readily. After polymerization, the polymer is isolated with conventional methods, for example by filtration or decanting, and optionally washed.

In method step b) first the amidomethylation reagent is produced. For this, for example, phthalimide or a phthalimide derivative is dissolved in a solvent, and admixed with formalin. Subsequently, with elimination of water therefrom, a bis(phthalimido)ether is formed. The bis(phthalimido)ether can optionally be converted to the phthalimidoester. Preferred phthalimide derivatives within the meaning of the present invention are phthalimide itself or substituted phthalimides, for example methylphthalimide.

As solvent, use is made in method step b) of inert solvents suitable for swelling the polymer, preferably chlorinated hydrocarbons, particularly preferably dichloroethane or methylene chloride.

In method step b) the polymer beads are condensed with phthalimide derivatives. As catalyst, use is made in this case of oleum, sulphuric acid or sulphur trioxide.

The elimination of the phthalic acid residue and thereby the liberation of the aminomethyl group proceeds in method step c) by treating the phthalimidomethylated crosslinked polymer beads with aqueous or alcoholic solutions of an alkali metal hydroxide, such as sodium hydroxide or potassium hydroxide, at temperatures between 100 and 250° C., preferably 120-190° C. The concentration of the sodium hydroxide solution is preferably in the range from 10 to 50% by weight, particularly preferably 20 to 40% by weight. This method enables the production of aminoalkyl-containing crosslinked polymer beads having substitution of the aromatic rings greater than 1.

The resultant aminomethylated polymer beads are finally washed alkali-free with demineralized water.

In method step d), the ion exchanger of the invention is produced by reacting the aminomethyl-containing monodisperse crosslinked vinylaromatic polymer beads from step c) in aqueous suspension with chloromethylpyridine or its hydrochloride, or with 2-chloromethylquinoline or 2-chloromethylpiperidine.

Chloromethylpyridine or its hydrochloride can be used as 2-chloromethylpyridine, 3-chloromethylpyridine or 4-chloromethylpyridine.

As preferred reagent, use is made in method step d) of 2-chloromethylpyridine hydrochloride, preferably in aqueous solution.

The reaction in method step d) proceeds with maintenance of a pH in the range from 4 to 9, and is preferably carried out with the addition of alkali, particularly preferably potassium hydroxide solution or sodium hydroxide solution, especially preferably sodium hydroxide solution. By addition of alkali in the reaction of the aminomethyl-containing monodisperse, crosslinked vinylaromatic basic polymer from method step c) in aqueous suspension with halomethylnitrogen heterocycles, preferably picolylchloride or its hydrochloride, the pH is maintained in the reaction in the range 4-9. Preferably, the pH is maintained in the range 6-8.

In the context of the present invention it has been found that the conversion rate of said reaction in method step d) considerably depends on the pH of the suspension present in the reaction. For instance, according to the invention, the highest conversion rate and therefore the highest yield are achieved at pHs of 4-9, preferably at pHs of 6-8, in particular at pHs around 7 (see Tab. 2)

The reaction according to method step d) preferably proceeds in the temperature range of 40 to 100° C., particularly preferably in the temperature range of 50 to 80° C.

The ion exchangers which are produced according to the invention and have chelating functional groups are suitable for the adsorption of metals, in particular heavy metals and noble metals, and their compounds, from aqueous solutions and organic liquids, preferably from acidic aqueous solutions. The ion exchangers which are produced according to the invention and have chelating groups are suitable particularly for removing heavy metals or noble metals from aqueous solutions, in particular from aqueous solutions of alkaline earth metals or alkali metals, from brines of alkali metal chloride electrolysis, from aqueous hydrochloric acids, from wastewaters or flue gas scrubbers, but also from liquid or gaseous hydrocarbons, carboxylic acids such as adipic acid, glutaric acid or succinic acid, natural gases, natural gas condensates, mineral oils or halogenated hydrocarbons, such as chlorinated or fluorinated hydrocarbons, or fluoro/chlorocarbons. In addition, the ion exchangers of the invention are suitable for removing alkaline earth metals from brines such as are customarily used in alkali metal chloride electrolysis. The ion exchangers of the invention, however, are also suitable for removing heavy metals, in particular iron, cadmium or lead, from substances which are reacted during an electrolytic treatment, for example a dimerization of acrylonitrile to form adiponitrile.

The ion exchangers produced according to the invention are very particularly suitable for removing mercury, iron, cobalt, nickel, copper, zinc, lead, cadmium, manganese, uranium, vanadium, elements of the platinum group, gold or silver from the abovementioned solutions, liquids or gases.

In particular, the ion exchangers of the invention are suitable for removing rhodium or elements of the platinum group and also gold, silver or rhodium or noble metal-containing catalyst residues from organic solutions or solvents.

In addition to metallurgy for recovering valuable metals, the monodisperse chelate exchangers having aminomethyl and/or aminomethyl nitrogen heterocyclic groups are outstandingly suitable for the most varied fields of use in the chemical industry, the electronics industry, the waste disposal/recycling industry or the electroplating, electroforming or surface technology.

It will be understood that the specification and examples are illustrative but not limitative of the present invention and that other embodiments within the spirit and scope of the invention will suggest themselves to those skilled in the art.

Analytical Methods

Determination of the Amount of Basic Aminomethyl Groups and/or Aminomethyl Nitrogen Heterocyclic Groups in the Crosslinked Polystyrene Polymer Beads 100 ml of the aminomethylated polymer beads are vibrated on the tamping volumeter and subsequently flashed into a glass column using deionized water. In 1 hour and 40 minutes, 1000 ml of 2% by weight sodium hydroxide solution are filtered through. Subsequently deionized water is filtered through until 100 ml of eluate admixed with phenolphthalein have a consumption of 0.1 n (0.1 normal) hydrochloric acid or at most 0.05 ml.

50 ml of this resin are admixed with 50 ml of deionized water and 100 ml of 1 n hydrochloric acid in a glass beaker. The suspension is stirred for 30 minutes and subsequently charged into a glass column. The liquid is drained off. A further 100 ml of 1 n hydrochloric acid is filtered through the resin in 20 minutes. Subsequently, 200 ml of methanol are filtered through. All eluates are collected and combined and titrated with 1 n sodium hydroxide solution against methyl orange.

The amount of aminomethyl groups in 1 litre of aminomethylated resin is calculated from the following formula: $(200-V) \cdot 20$=mol of aminomethyl groups per litre of resin.

Determination of the Amount of Methylpyridine Groups in the Chelate Resin 50 ml of moist aminomethylated polymer beads are dried to constant weight in vacuum at 70° C. in a drying cabinet.

50 ml weigh 14.78 gram dry.

100 ml of the methylpyridine-bearing chelate resin in the sulphate form from Example 1d) are charged into a column. From the top, 400 ml of 4% strength by weight aqueous sodium hydroxide solution are filtered through. Subsequently, from the top, deionized water, to extract the residual sodium hydroxide solution, is filtered through until the eluate has a pH<10.

50 ml of the resin thus treated are dried to constant weight at 70° C. in vacuum in a drying cabinet.

50 ml weigh 18.47 gram dry.

The total dry weight of aminomethylated polymer beads (300 ml) from Example 1c) is 88.73 gram.

Total dry weight of methylpyridine-bearing inert polymer beads in the free base form (555 ml) from Example 1d) is 205.04 gram.

205.04 gram−88.73 gram=116.31 gram.

The methylpyridine-bearing resin from Example 1d) contains 116.31 gram of methylpyridine groups, equivalent to 1.264 mol of methylpyridine.

300 ml of aminomethylated polymer beads from Example 1c) contain 300×2.17=651 mmol of basic groups.

Each basic aminomethyl group contains two hydrogen atoms which can be replaced by methylpyridine groups.

1.264/0.651=1.94

On a statistical average, of the two hydrogen atoms, 1.94 are replaced by methylpyridine groups.

EXAMPLES

Example 1

1a) Production of the Monodisperse, Macroporous Polymer Beads Based on Styrene, Divinylbenzene and Ethylstyrene 3000 g of deionized water were charged into a 10 l glass reactor and a solution of 10 g of gelatine, 16 g of disodium hydrogenphosphate dodecahydrate and 0.73 g of resorcinol in 320 g of deionized water was added and mixed. The temperature of the mixture was controlled to 25° C. With stirring, subsequently a mixture of 3200 g of microencapsulated monomer droplets having a narrow particle size distribution of 3.6% by weight of divinylbenzene and 0.9% by weight of ethylstyrene (used as commercially available mixture of isomers of divinylbenzene and ethylstyrene containing 80% of divinylbenzene), 0.5% by weight of dibenzoyl peroxide, 56.2% by weight of styrene and 38.8% by weight of isododecane (technical mixture of isomers having high fraction of pentamethylheptane) was added, wherein the microcapsules consisted of a formaldehyde-cured complex coacervate of gelatine and a copolymer of acrylamide and acrylic acid, and 3200 g of aqueous phase having a pH of 12 were added. The mean particle size of the monomer droplets was 460 µm.

The batch was polymerized to exhaustion with stirring by temperature elevation according to a temperature programme starting at 25° C. and ending at 95° C. The batch was cooled, washed over a 32 µm sieve and subsequently dried in vacuum at 80° C. This produced 1893 g of a spherical polymer having a mean particle size of 440 µm, narrow particle size distribution and smooth surface.

The polymer was chalky white in appearance and had a bulk density of approximately 370 g/l.

1b) Production of Amidomethylated Polymer Beads

At room temperature, 1819 g of dichloroethane, 540.7 g of phthalimide and 373.65 g of 30.1% strength by weight formalin were charged. The pH of the suspension was adjusted by sodium hydroxide solution to 5.5 to 6. Subsequently, the water was removed by distillation. Then, 39.6 g of sulphuric acid were added. The resultant water was removed by distillation. The batch was cooled. At 30° C., 144.9 g of 65% strength oleum and subsequently 371.4 g of monodisperse polymer beads produced according to method step 1a) were added. Subsequently, a further 1100 ml of 1,2-dichloroethane were added. The suspension was heated to 70° C. and stirred at this temperature for a further 6.5 hours. The reaction broth was taken off, deionized water was added and residual amounts of dichloroethane were removed by distillation.

| Yield of amidomethylated polymer beads: | 1860 ml |
|---|---|
| Elemental composition: | |
| Carbon: | 76.6% by weight; |
| Hydrogen: | 4.9% by weight; |
| Nitrogen: | 5.5% by weight; |
| Remainder: | Oxygen. |

1c) Production of Aminomethylated Polymer Beads

To 1830 ml of amidomethylated polymer beads from Example 1b) were added 2496 g of 17.4% strength by weight of sodium hydroxide solution at room temperature. The suspension was heated to 180° C. and stirred at this temperature for 8 hours. Thereafter the mixture was cooled to room temperature. The resultant polymer beads were washed with deionized water.

| Yield of aminomethylated polymer beads: | 1510 ml |
|---|---|
| Total estimated yield: | 1535 ml |
| Elemental composition: | |
| Nitrogen: | 9.8% by weight |
| Carbon: | 80.1% by weight |
| Hydrogen: | 8.1% by weight |
| Oxygen: | 2.5% by weight |
| HCl number: | 2.17 mol/l |

It may be calculated from the elemental composition of the aminomethylated polymer beads that, on a statistical average, per aromatic ring, originating from the styrene and divinylbenzene units, 1.0 hydrogen atom were substituted by aminomethyl groups.

1d) Production of Methylpyridine-Bearing Chelate Resin at pH 7

To 200 ml of deionized water, 300 ml of aminomethylated polymer beads from Example 1c) were added at room temperature. The suspension was heated to 70° C. Subsequently, in 4 hours, 293.6 g of an 80% strength by weight aqueous solution of picolyl chloride hydrochloride were added. At the same time, the pH of the suspension was kept at pH 7 by addition of 50% strength by weight sodium hydroxide solution. Then, the mixture was stirred for a further 6 hours at this temperature.

Thereafter, the suspension was cooled. The resin was washed chloride-free with deionized water.

Yield: 555 ml 50 ml of resin weighed 18.47 gram dried.

On a statistical average, of the two hydrogen atoms, 1.94 were replaced by methylpyridine groups.

The resin was packed into a column and charged from the top with 4000 ml of 4% strength by weight sulphuric acid and converted to the sulphate form.

Resin volume: 675 ml

Total capacity of the resin in the sulphate form: 1.97 mol/l of resin

Example 2

Production of Methylpyridine-Bearing Chelate Resin at pH 8

The reaction proceeded as in Example 1c), except that pH 8 was used.

Yield: 545 ml 50 ml of resin weighed 18.41 gram dried.

On a statistical average, of the two hydrogen atoms, 1.87 were replaced by methylpyridine groups.

The resin was packed into a column and charged from the top with 4000 ml of 4% strength by weight sulphuric acid and converted to the sulphate form.

Resin volume: 655 ml

Total capacity of the resin in the sulphate form: 1.956 moil of resin

Example 3

Production of Methylpyridine-Bearing Chelate Resin at pH 9

The reaction proceeded as in Example 1c), except that pH 9 was used.
Yield: 535 ml
50 ml of resin weighed 18.34 gram dried
On a statistical average, of the two hydrogen atoms, 1.80 were replaced by methylpyridine groups.
The resin was packed into a column and charged from the top with 4000 ml of 4% strength by weight sulphuric acid and converted to the sulphate form.
Resin volume: 645 ml
Total capacity of the resin in the sulphate form: 1.952 mol/l of resin

Example 4

Production of Methylpyridine-Bearing Chelate Resin at pH 10

The reaction proceeded as in Example 1c), except that pH 10 was used.
Yield: 520 ml
50 ml of resin weighed 18.13 gram dried
On a statistical average, of the two hydrogen atoms, 1.67 were replaced by methylpyridine groups.
The resin was packed into a column and charged from the top with 4000 ml of 4% strength by weight sulphuric acid and converted to the sulphate form.
Resin volume: 640 ml
Total capacity of the resin in the sulphate form: 1.972 mol/l of resin Deionized water in the context of the present invention is characterized in that it has a conductivity of 0.1 to 10 μS, wherein the content of dissolved or undissolved metal ions is no greater than 1 ppm, preferably no greater than 0.5 ppm for Fe, Co, Ni, Mo, Cr, Cu as individual components and is no greater than 10 ppm, preferably no greater than 1 ppm for the sum of the said metals.

Example 5

10 ml of chelate resin from Example 1d) were placed into 250 ml of a copper sulphate solution which contained 0.99 gram of copper/litre of solution, and the pH of which was adjusted to pH 2. The suspension was shaken for 5 hours at room temperature. Subsequently, the residual copper content in the solution was analysed: 0.009 gram of copper/litre of solution.

Example 6

10 ml of DOW M 4195 chelate resin were placed into 250 ml of a copper sulphate solution which contained 0.99 gram of copper/litre of solution, and the pH of which was adjusted to pH 2. The suspension was shaken for 5 hours at room temperature. Subsequently, the residual copper content in the solution was analysed: 0.09 gram of copper/litre of solution.

In Examples 5 and 6 it is shown that the chelate resin containing methylpyridine groups which was produced according to the invention takes up copper ions from aqueous solution significantly more rapidly than the commercial product DOW M 4195, a heterodispersed chelate resin having picolyl groups, see also Table 1.

The chelate resin produced according to the invention in addition shows a more favourable kinetic behaviour than DOW M 4195.

TABLE 1

|  | Example 5 | Example 6 |
|---|---|---|
| Copper content in the starting solution 0.99 g/l | 0.99 | 0.99 |
| Copper content in the solution after shaking for 5 hours, in g/l | 0.009 | 0.09 |

Table 2 shows the degree of the double substitution as a function of the pH, and also the increase in yield at lower pHs during the production process.

TABLE 2

| Example | pH of the reaction | Yield of end product | Double substitution |
|---|---|---|---|
| 1 | 7 | 555 | 1.94 |
| 2 | 8 | 545 | 1.87 |
| 3 | 9 | 535 | 1.80 |
| 4 | 10 | 520 | 1.67 |

The present invention has been described with reference to specific details of particular embodiments and examples thereof. It is not intended that such details be regarded as limitations upon the scope of the invention except insofar as and to the extent that they are included in the accompanying claims. As used in this specification and the appended claims, the singular forms "a," "an," and "the" include plural referents unless the content clearly dictates otherwise.

What is claimed is:

1. A method for producing monodisperse chelate exchanger comprising:
   aminomethyl nitrogen heterocyclic groups as functional groups thereof, comprising:
   a) reacting monomer droplets of (i) at least one monovinylaromatic compound, (ii) at least one polyvinylaromatic compound in the presence of one initiator or an initiator combination, thereby forming monodisperse crosslinked polymer beads,
   b) amidomethylating the monodisperse crosslinked polymer beads with one or more phthalimide derivatives, thereby forming amidomethylated polymer beads,
   c) converting the amidomethylated polymer beads to aminomethylated polymer beads, and
   d) reacting the aminomethylated polymer beads with halomethyl nitrogen heterocycles, without post-crosslinking, maintaining a pH in the range 4 to 9, to form the monodisperse chelate exchanger comprising aminomethyl nitrogen heterocyclic groups as functional groups thereof.

2. The method according to claim 1, wherein the monomer droplets are microencapsulated with a complex coacervate.

3. The method according to claim 1, wherein step a) is carried out in the presence of a protective colloid.

4. The method according to claim 1, wherein the monovinylaromatic compound is a monoethylenically unsaturated compound.

5. The method according to claim 1, wherein in method step b), the phthalimide derivative is a phthalimidoether.

6. The monodisperse chelate exchanger obtained according to the method of claim 1.

* * * * *